US011938599B1

(12) United States Patent
Foss

(10) Patent No.: US 11,938,599 B1
(45) Date of Patent: Mar. 26, 2024

(54) TOOL FOR POSITIONING AND HOLDING A BOARD FOR MOUNTING TO A SUPPORT MEMBER SUCH AS ANOTHER BOARD

(71) Applicant: Wayne R Foss, Hendersonville, NC (US)

(72) Inventor: Wayne R Foss, Hendersonville, NC (US)

(73) Assignees: Wayne R. Foss, Hendersonville, NC (US); Janet C. Foss, Hendersonville, NC (US)

( * ) Notice: Subject to any disclaimer, the term of this patent is extended or adjusted under 35 U.S.C. 154(b) by 0 days.

(21) Appl. No.: 17/725,515

(22) Filed: Apr. 20, 2022

Related U.S. Application Data

(60) Provisional application No. 63/178,513, filed on Apr. 22, 2021.

(51) Int. Cl.
*B25B 5/16* (2006.01)
*B25B 7/02* (2006.01)

(52) U.S. Cl.
CPC ................ *B25B 5/163* (2013.01); *B25B 7/02* (2013.01)

(58) Field of Classification Search
CPC .. B25B 7/00; B25B 7/02; B25B 27/00; B25B 5/163; Y10T 29/539
USPC ... 81/46, 418, 419, 420, 421, 422, 423, 424, 81/424.5, 426, 426.5; 269/22, 96
See application file for complete search history.

(56) References Cited

U.S. PATENT DOCUMENTS

| | | | | |
|---|---|---|---|---|
| 3,169,034 A * | 2/1965 | Epstein | B65G 7/12 | 29/268 |
| 4,238,123 A * | 12/1980 | Bardes | B25B 5/142 | 269/41 |
| 5,351,585 A | 10/1994 | Leseberg et al. | | |
| 6,443,441 B1 | 9/2002 | Buitenhuis | | |
| 2002/0109281 A1 * | 8/2002 | Buitenhuis | B25B 5/125 | 269/41 |

* cited by examiner

*Primary Examiner* — Lee D Wilson
*Assistant Examiner* — Alberto Saenz
(74) *Attorney, Agent, or Firm* — Potomac Law Group, PLLC

(57) ABSTRACT

A tool is provided for relative positioning of a first board and a second board such that the first and second boards can be secured to each other. The tool comprises a base portion including a pair of locking pliers, and grabbing portions respectively secured to jaws of the locking pliers. The grabbing portions are configured to receive the first board therebetween when the grabbing portions are brought toward each other by operation of the pliers. The grabbing portions further have parts disposed to abut a thickness surface of the received first board and projections disposed to embed into opposite side surfaces of the received first board. At least one of the grabbing portions has a forwardly projecting member disposed to be abutted with the second board to position adjacent edges of the received first board and the second board substantially flush with each other.

14 Claims, 8 Drawing Sheets

TOOL FOR POSITIONING AND HOLDING A BOARD FOR MOUNTING TO A SUPPORT MEMBER SUCH AS ANOTHER BOARD

CROSS-REFERENCE TO RELATED APPLICATION

This application claims the benefit of U.S. Provisional Patent Application No. 63/178,513 filed Apr. 22, 2021, the entirety of which is incorporated herein by reference.

FIELD

This invention relates to a tool for use in construction work, and more particularly to a tool for use in positioning a board such as a joist or rafter for mounting to a support member such as a ledger board (in deck construction) or a ridge board (in roof construction).

BACKGROUND

Traditionally, the installation of a joist or rafter has involved manually positioning and holding the board in in place while the board is secured to the support member, which is oriented along a plane substantially perpendicular to the board. The board is secured to the support member in a state in which a longitudinal end of the board is abutted with a side surface of the support member, with abutted top edges of the board and the support member being level with each other, the top surfaces of the boards thereby also being level with each other Due to the board's typically cumbersome nature, the process generally requires at least two people, including at least one person to hold the board in position and another person to secure the board to the support member while the board is being held in position.

The tool of the present invention avoids the labor-intensive requirements of the traditional installation process and enables simple and accurate positioning and holding of a board for mounting to a support member. The tool also has other applications, examples of which are later described.

SUMMARY OF THE INVENTION

In one of its principal aspects, the invention provides a tool for relative positioning of a first board and a second board such that the first and second boards can be secured to each other, the tool comprising a base portion including a pair of locking pliers, and grabbing portions respectively secured to jaws of the locking pliers. The grabbing portions are configured to receive the first board therebetween when the grabbing portions are brought toward each other by operation of the pliers. The grabbing portions further have parts disposed to abut a thickness surface (surface extending between opposite widthwise surfaces) of the received first board and projections disposed to embed into opposite side surfaces of the received first board. At least one of the grabbing portions has a forwardly projecting member disposed to be abutted with the second board to position adjacent edges of the received first board and the second board substantially flush with each other.

In use of the tool, the locking pliers are set or adjusted to lock the tool onto the received board. The embedding projections prevent the board from slipping out of the tool. With the forwardly projecting member or members abutted with the second board, the relative positioning of the boards is maintained, thereby freeing the user to let go of the pliers and secure the boards to each other without assistance. For example, when the first board is a joist and the second board is a ledger board, the forwardly projecting member(s) is (are) rested on a top thickness surface of the ledger board such that the surface is level with the top thickness surface of the joist. The tool maintains this relative positioning of the joist and the ledger board so that they may be secured by the user without further assistance. As another example, when the first board is a rafter and the second board is a ridge board, the forwardly projecting member(s) is (are) rested on an edge portion of the ridge board to position a top end-edge of the rafter substantially flush with a top side-edge of the ridge board. The tool maintains this relative positioning of the rafter and the ridge board so that they may be secured by the user without further assistance.

In another of its principal aspects, the present invention provides a tool for use in positioning a board, such as a joist or rafter, for mounting to a support member, the tool comprising a base portion including a pair of locking pliers and grabbing portions respectively secured to jaws of the locking pliers. The grabbing portions are configured to receive the board therebetween when the grabbing portions are brought toward each other by operation of the pliers. The grabbing portions further have parts disposed to abut a thickness surface of the received board and projections disposed to embed into opposite side surfaces of the received board. At least one of the grabbing portions has a forwardly projecting member disposed to be abutted with the support member to position adjacent edges of the received board and the support member substantially flush with each other.

In yet another of its principal aspects, the present invention provides a tool for use in positioning a board, such as a joist or rafter, for mounting to a support member, the tool comprising a base portion including a pair of locking pliers, and; and a pair of grabbing members respectively secured to jaws of the locking pliers. The pair of grabbing members have respective base walls and sidewalls configured to form a substantially U-shaped channel for receiving the board when the grabbing members are brought toward each other by operation of the pliers, each base wall having a forwardly projecting tab disposed to be abutted with the support member. Respective teeth project inwardly from an upper end portion of each sidewall for embedding into the board received by the grabbing members.

BRIEF DESCRIPTION OF THE DRAWINGS

Various features and advantages of the invention, as well as additional aspects thereof, will be appreciated from the following description taken in conjunction with the accompanying drawings, wherein.

DESCRIPTION OF PREFERRED EMBODIMENT

Figure 1:
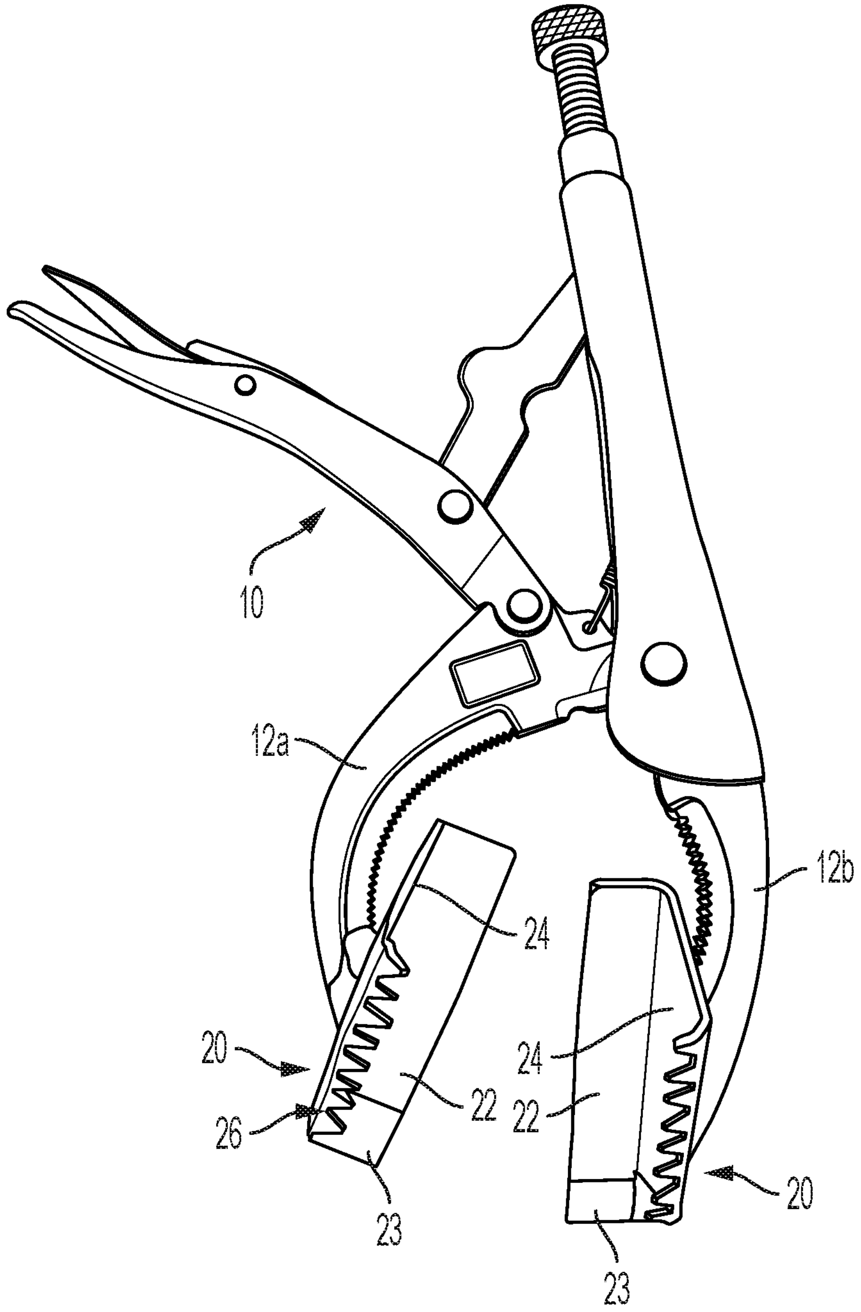
FIG. 1 is a top perspective view of a tool in accordance with the invention.
Figure 2:
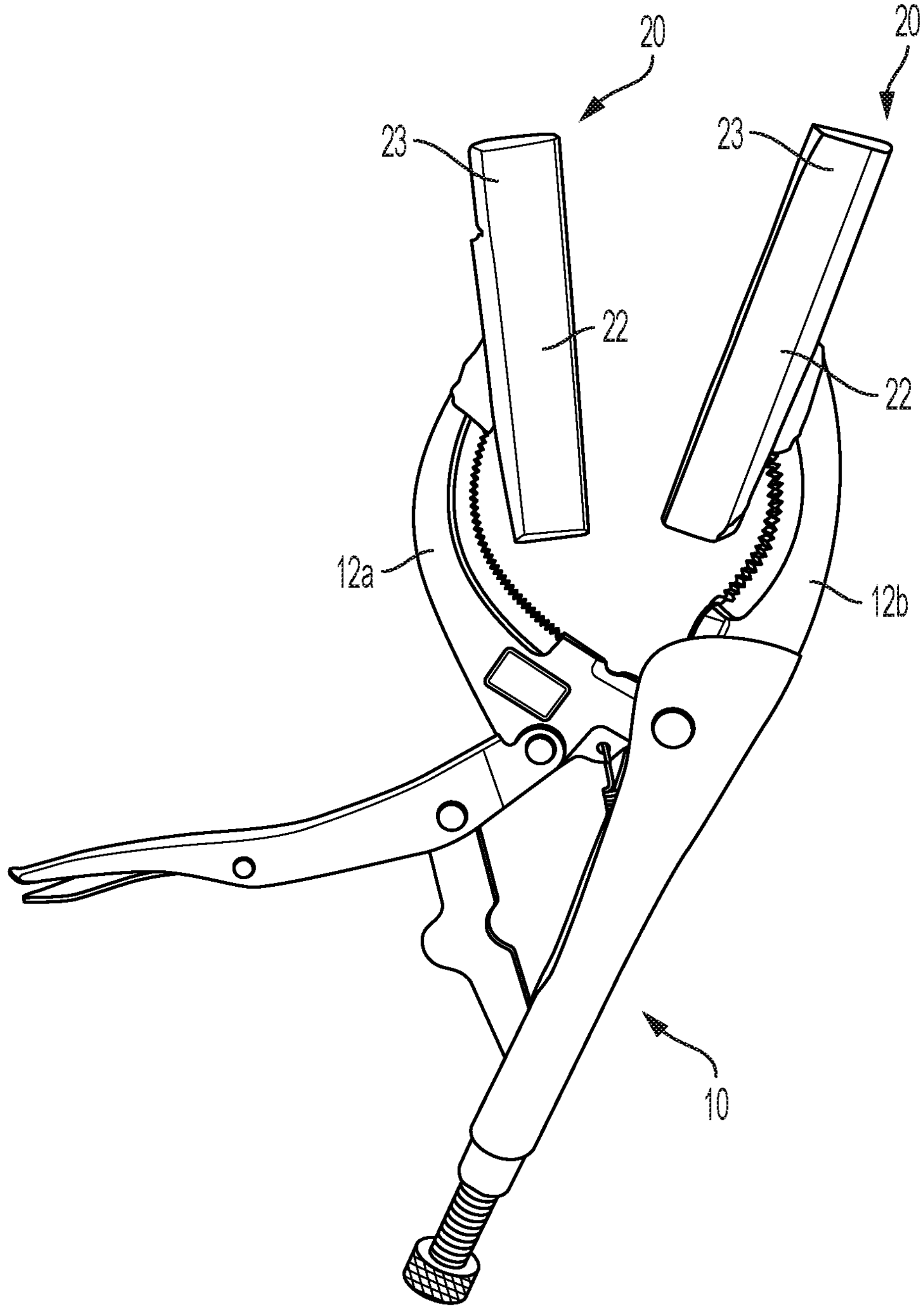
FIG. 2 is a bottom perspective view of the tool.

FIGS. 1-4 show a preferred embodiment of a tool according to the present invention. In the form shown, the tool comprises a base or handle portion 10, constituted by a pair of locking pliers, and grabbing portions constituted by a pair of board grabbing members 20 respectively attached to the jaws 12*a*, 12*b* of the pliers. The locking pliers are preferably constructed as described in U.S. Pat. No. 5,351,585 entitled "Large Capacity Locking Pliers," which is incorporated herein by reference.

Each board grabbing member 20 comprises a base wall 22, a sidewall 24 joined to the base wall, and at least one but preferably a plurality of members projecting inwardly relative to the sidewall for embedding into the board. In the illustrative embodiment, such members are constituted by a plurality of teeth 26 projecting inwardly from the upper end of the sidewall. However, it will be appreciated that such teeth or other embedding projections can be arranged on the inner surface of the sidewall if desired.

Each grabbing member is preferably a unitary steel (or other suitable metallic material) plate member with the teeth 26 being formed in a portion inwardly bent from the upper end of the sidewall 24. The sidewall 24 is of substantially right trapezoidal configuration and is welded to a corresponding jaw 12*a* or 12*b* of the handle portion 10. At the front or distal end of at least one grabbing member (but preferably both grabbing members), the base wall 22 has a tab 23 projecting forward relative to the sidewall. The tab 23 is coplanar with the base wall 22 and disposed at an obtuse angle $\alpha$ of about 135° relative to the front edge 25 of the sidewall. The bottom and front edges of the sidewall form an acute angle $\beta$ of about 45°. This arrangement facilitates use of the tool for positioning rafters as will be seen hereinafter, although the use of other angles is certainly permissible consistent with the broader principles of the invention. The tab serves to rest on the support member for the joist or rafter, thereby supporting the joist or rafter in position for mounting.

Figure 3:
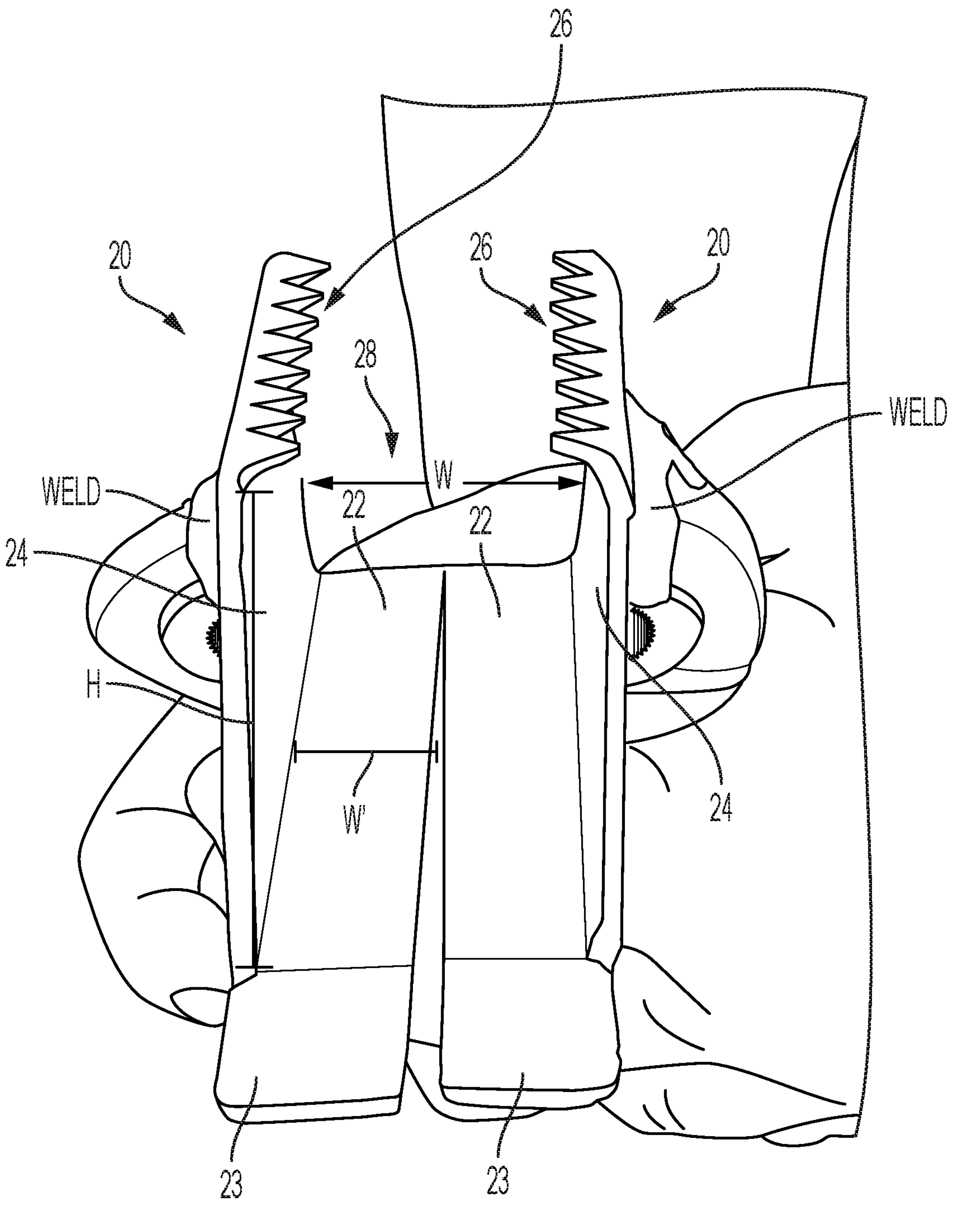
FIG. 3 is a close-up view of the board grabbing members of the tool.

As will be most readily appreciated from FIG. 3, the grabbing members 20 are configured to form a substantially U-shaped channel 28 when brought together by the pliers. Further, the configuration is such that the U-shaped channel is dimensioned to closely receive a board with the teeth 26 (or other projections as previously discussed) embedding into the sides of the board under force of the pliers 10 when the pliers are operated to bring the grabbing members together. The pliers are preferably set or adjusted to come into a locked state in this condition so that the tool is locked onto the board, thereby freeing the user to let go of the pliers without loss of engagement of the tool and the board. For use with 2× lumber (2 inches nominal thickness), a channel width W of 1.5 inches corresponding to the actual finished thickness can be used. In the form shown, each of the sidewalls has a height H greater than a width W' of the corresponding base wall. The sidewall height is sufficiently greater than the base wall width that the height of the channel is greater than the channel width W.

Figure 4:
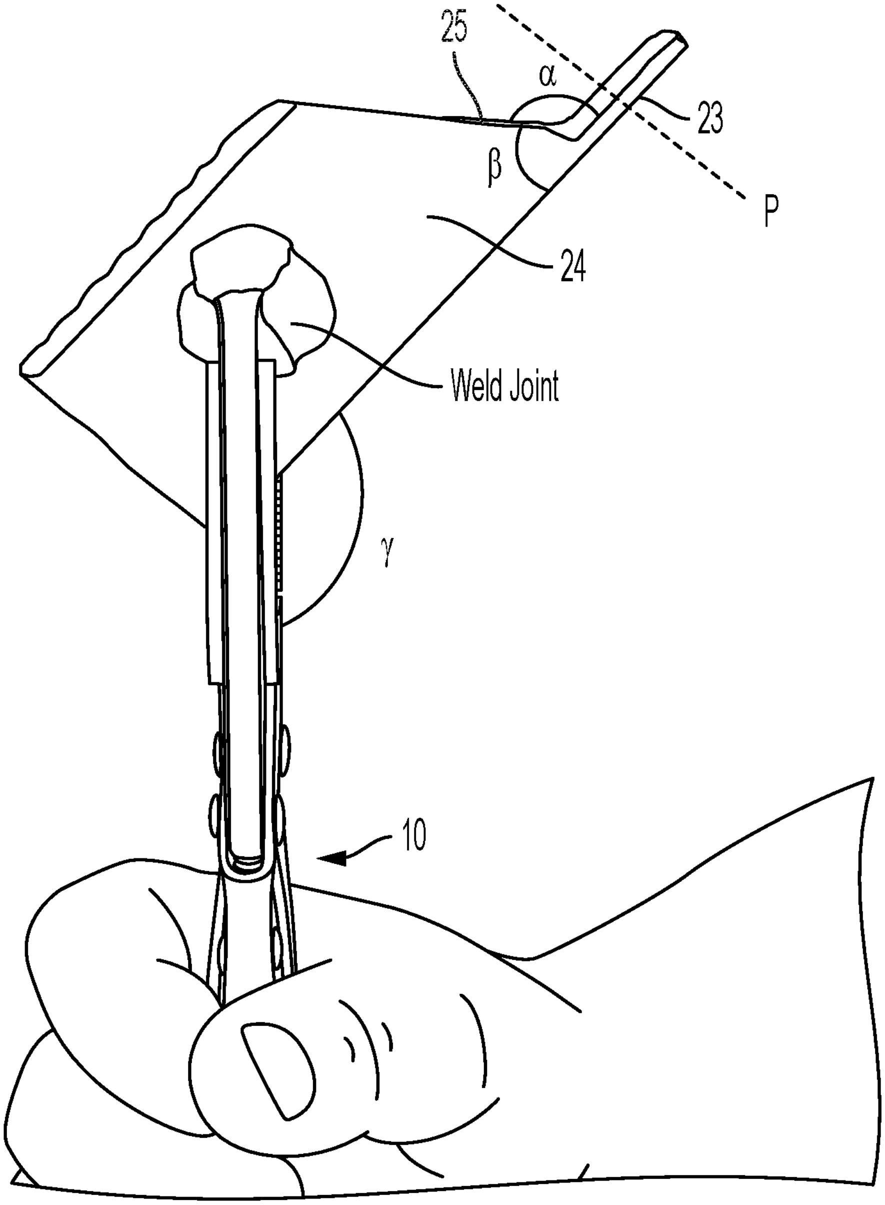
FIG. 4 is a side view of the tool.

In the illustrative embodiment, the grabbing members 20 are secured to the jaws 12*a*, 12*b* by welding. However, the invention is not limited to welding. For example, the grabbing members may be integrally formed with the respective jaws, or the jaws and grabbing members may be formed with interlocking portions that secure the grabbing members in place. As shown in FIG. 4, the locking pliers are arranged so as not to intersect a plane P passing perpendicularly through the tabs 23. The pliers preferably extend rearwardly of the grabbing members and are arranged at an obtuse angle $\gamma$ relative to the base walls of the grabbing members.

Since the plier jaws need not provide working surfaces to hold workpieces in practice of the invention, they need not be configured with serrations or other surface formations conventionally used for such purpose. As the base or handle portion 10 of the illustrative embodiment is constituted by a commercially available pair of locking pliers, serrations are present on the jaws. The use of commercially available locking pliers offers a certain convenience, since the grabbing members may simply be welded to the respective jaws. But it will suffice to provide a base or handle portion that offers the locking/releasing function, and preferably also the adjustment function, of the locking pliers handle set.

The use of large capacity locking pliers having curved jaws 12*a*, 12*b* is advantageous because jaws are more readily attached to the sidewalls 24 at or near the centers of the sidewall outer surfaces. The squeezing force of the jaws at the welded joints with sidewalls thereby becomes more normal to the sidewalls 24 as compared to the use of straight jaw pliers. This avoids undue deformation of the grabbing members and ensures a more uniform squeezing force of the grabbing members on the side surfaces of a board received in the U-shaped channel 28.

Figure 5:
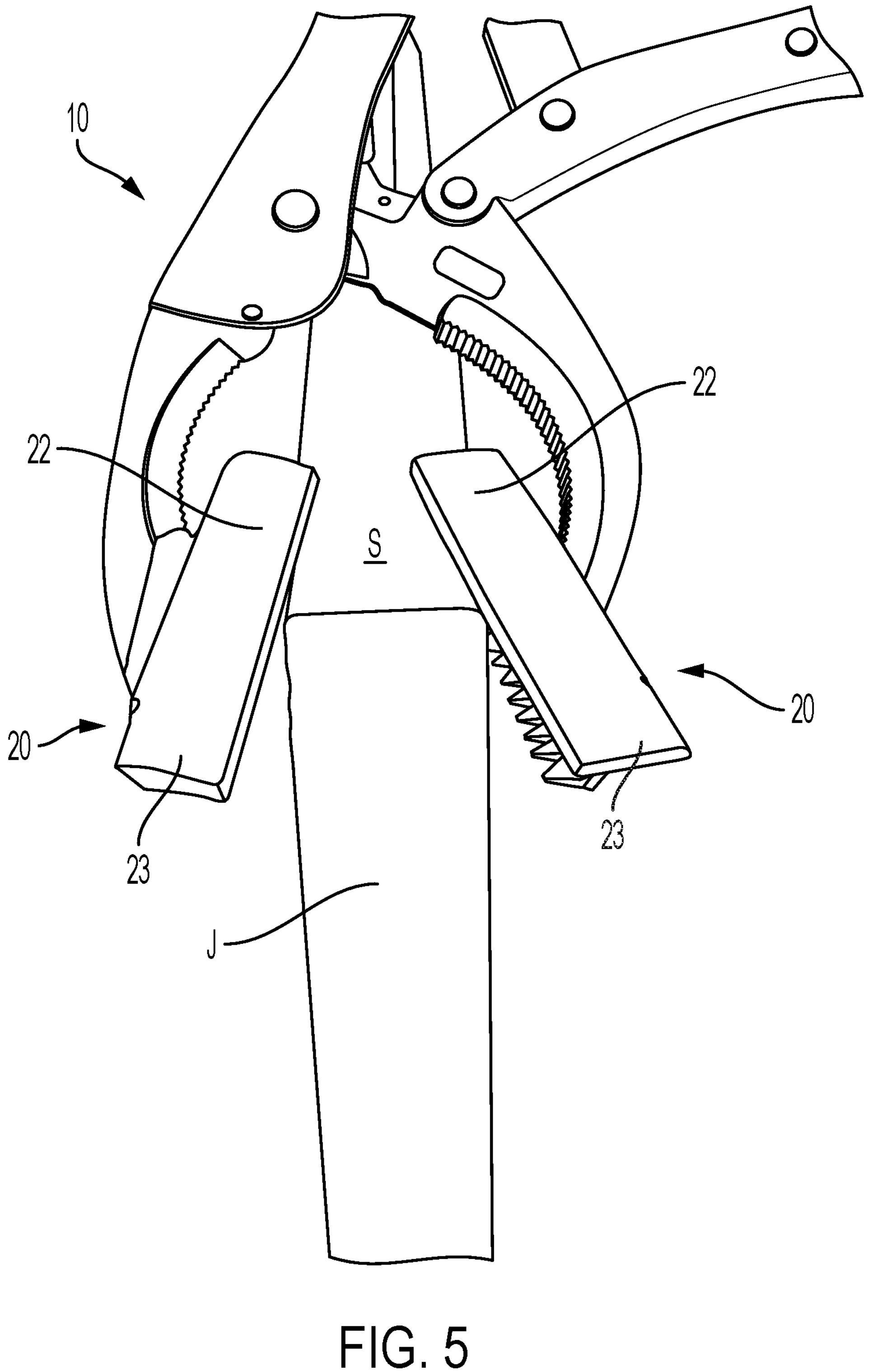
FIG. 5 is a view illustrating how the tool is attached to a joist.
Figure 6:
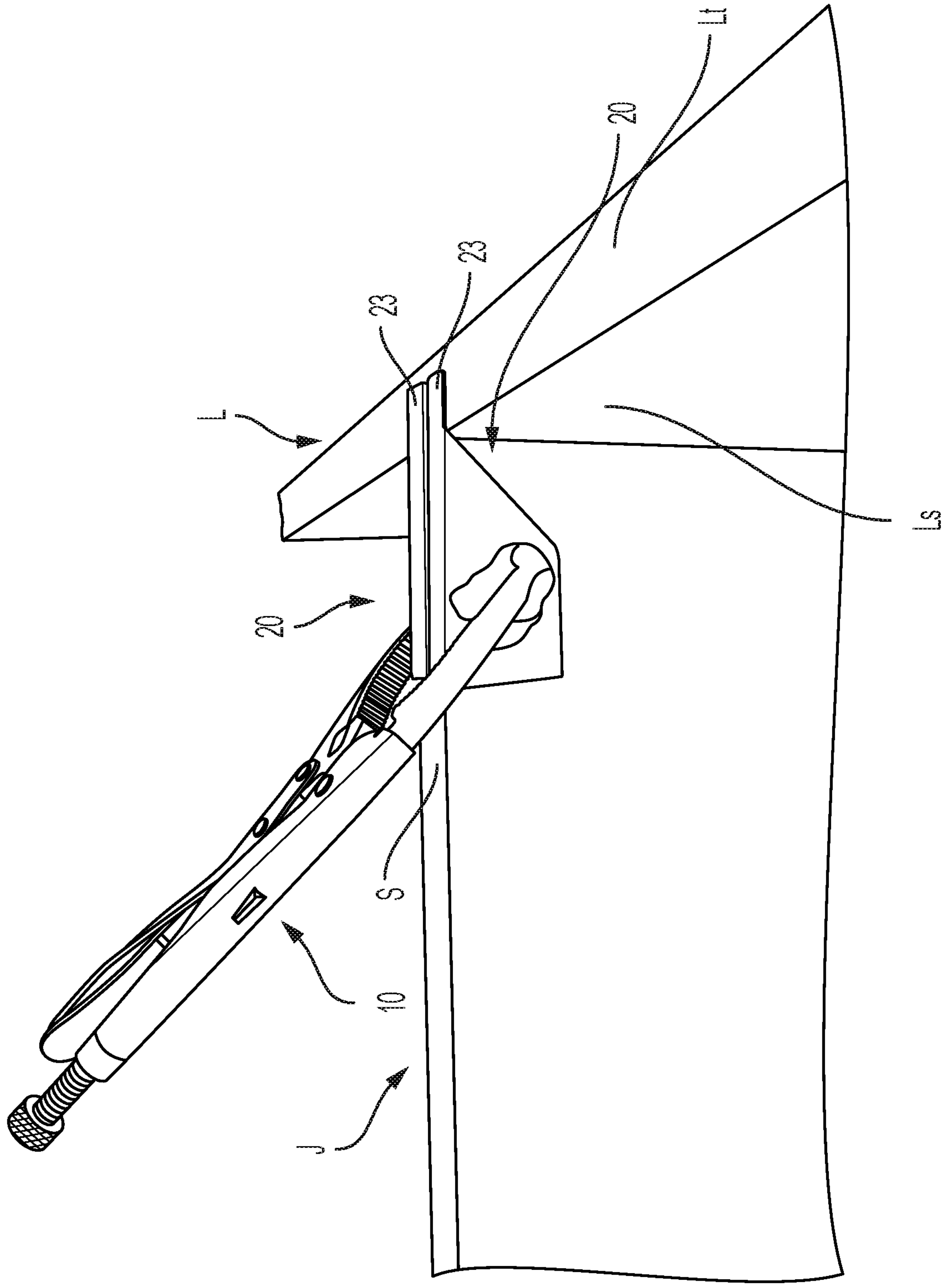
FIG. 6 is a view illustrating the tool holding the joist in position for securing to a ledger board.
Figure 7:
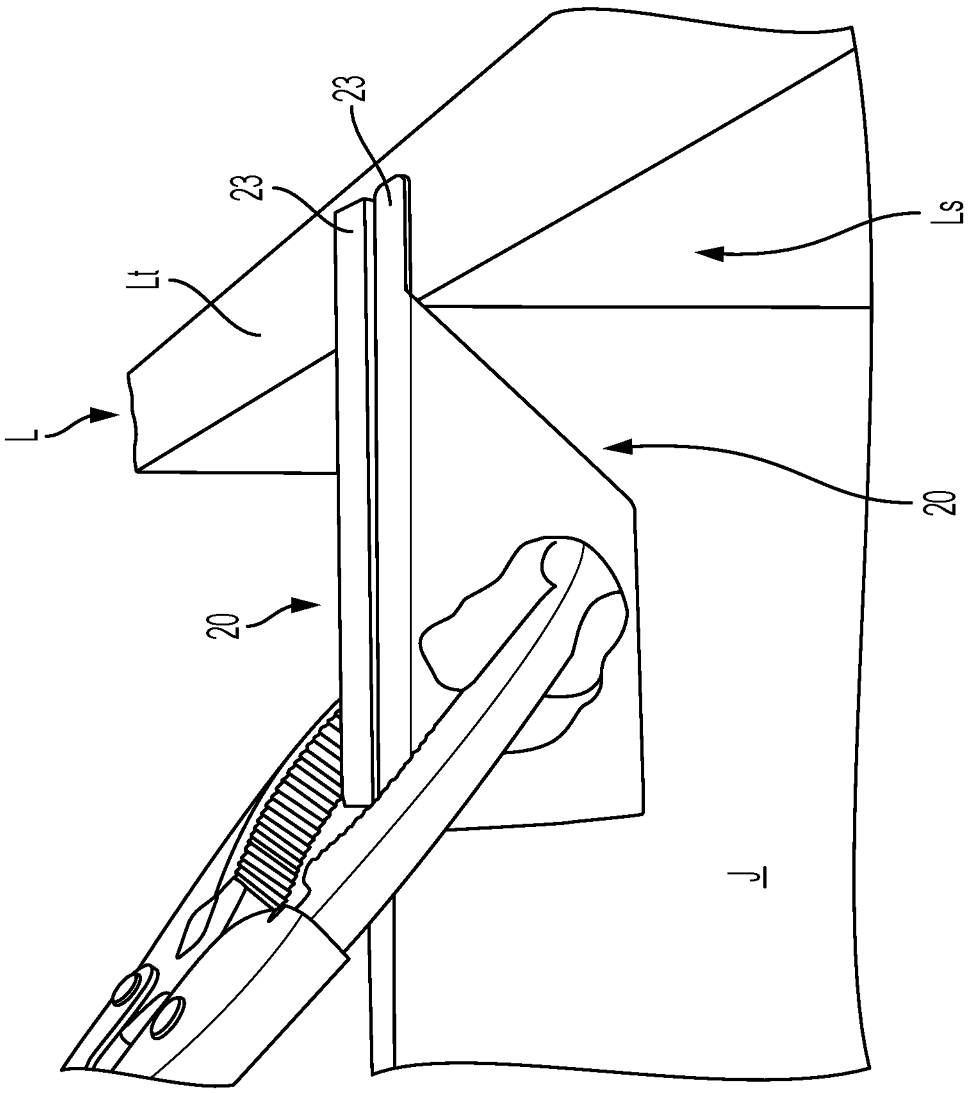
FIG. 7 is a close-up view of a portion of FIG. 6.

FIGS. 5-7 illustrate the use of the tool the tool for holding a joist J in position for securing to a ledger board L. At first, the jaws of the pliers are opened and the grabbing members are placed over the end portion of the joist with the tabs 23 of the grabbing members projecting beyond the end of the joint and the base walls 22 situated in face-to-face contact with the top thickness surface S of the joist. See FIG. 5. The pliers are then closed to bring the grabbing members together to squeeze the joist and embed the teeth 26 of the grabbing members into the sides of the joist, whereupon the pliers assume a locked condition to lock the tool to the joist. It will be appreciated that with the teeth 26 embedded into the joist, the joist cannot slip from the grasp of the tool. In this state, the joist J is positioned to abut its end to a side surface Ls of the ledger board L with the tabs 23 resting in face-to-face contact with the top surface Lt of the ledger board. Because the base walls 22 are and the tabs 23 are coplanar, the top thickness surfaces of the joist and the ledger board are aligned so as to be flush with each other. The tool thus holds the joist in proper position for mounting to the ledger board, such as by securing a joist hanger to the joist and the ledger board in a conventional manner. The same installer who places the joist in position on the ledger board becomes free to secure the joist to the ledger board because the tool serves to hold the joist in the proper position. The need for an additional person to secure the joist, as in the traditional installation process, is thereby avoided. Once the joist is secured, the locking pliers are released and opened, and the tool is removed from the joist.

Figure 8:
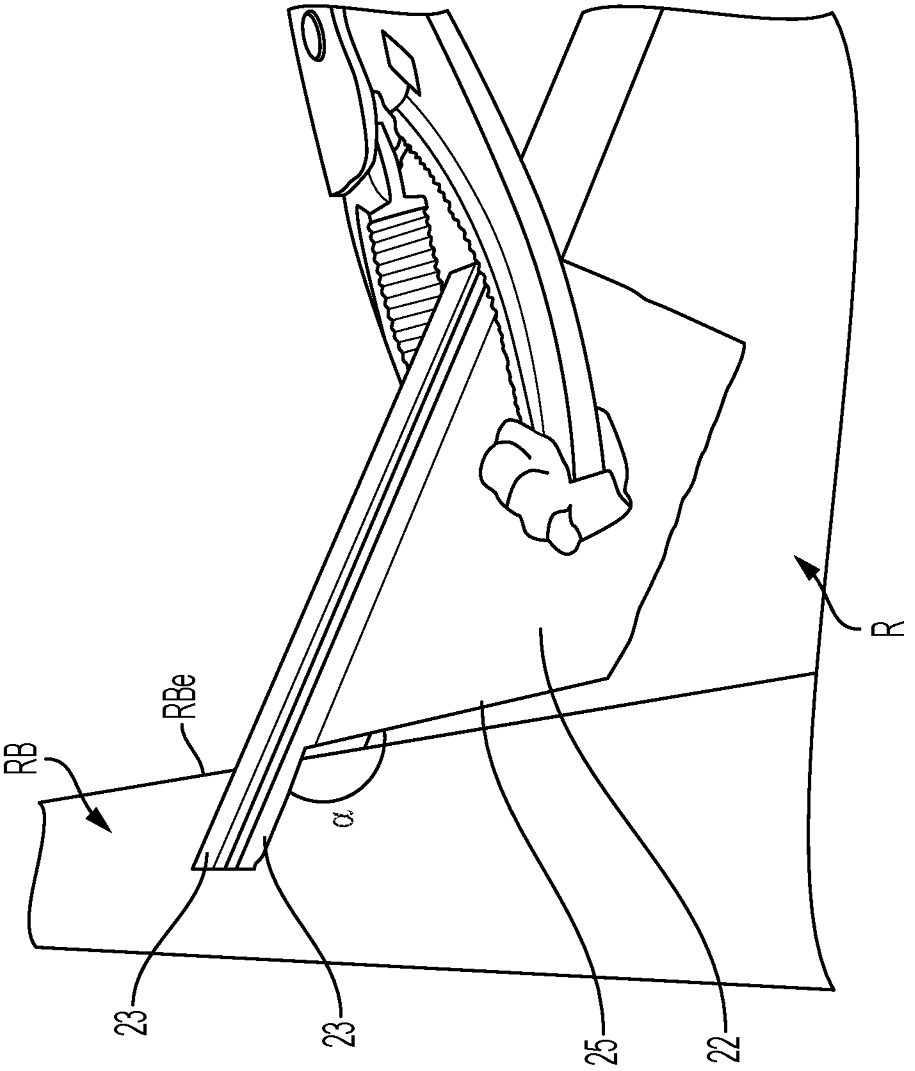
FIG. 8 is a view illustrating the tool holding a rafter in position for securing to a ridge board.

FIG. 8 illustrates the use of the tool the tool for holding a rafter R in position for securing to a ridge board RB. The tool is locked onto the rafter board using the same technique as shown and described in connection with FIG. 5. The rafter R is then positioned to abut its end to a side surface of the ridge board RB with the tabs 23 resting in contact with (abutted with) the adjacent edge RBe of the ridge board. The top edge of the rafter R is thus held substantially flush with the adjacent edge of the ridge board. As will be appreciated from FIG. 8, the obtuse angle $\alpha$ between each tab 23 and the front edge 25 of the corresponding sidewall 22 provides clearance to accommodate the angle between the rafter and the ridge board so that the front edge does not interfere with the ridge board. With the tool holding the rafter in position, the installer becomes free to secure the rafter to the ridge board, such as by nailing or screwing in a conventional manner, and the need for an additional person to secure the rafter in place is avoided.

While a preferred embodiment of the invention has been described above, those skilled in the art will appreciate that various changes and modifications can be made without departing from the broader principles of the invention. Moreover, other uses of the invention are possible in addition to those described above. For example, the tool may be used to position a wall stud for securing to a bottom or top plate. Another use would be to attach a band board to the free ends of a row of cantilevered joists. In such a case, a plurality of the tools would be respectively clamped to the bottoms of a plurality of joists with the tabs 23 projecting from the ends of the joists to provide resting surfaces on which to position the band board, which may then be secured to the joist ends.

The invention claimed is:

1. A tool for use in positioning a board, such as a joist or rafter, for mounting to a support member, the tool comprising:

a base portion including a pair of locking pliers; and a pair of grabbing members respectively secured to jaws of the locking pliers, the pair of grabbing members having respective base walls and sidewalls configured to form a substantially U-shaped channel for receiving the board when the grabbing members are brought toward each other by operation of the locking pliers, each base wall extending forwardly at an obtuse angle relative to the locking pliers to a free front end defined by a forwardly projecting tab disposed to be abutted with the support member, and each grabbing member being provided with at least one member projecting inwardly relative to the corresponding sidewall for embedding into the board received in the channel.

2. The tool according to claim 1, wherein each sidewall is of substantially right trapezoidal shape.

3. The tool according to claim 2, wherein each forwardly projecting tab is substantially coplanar with the corresponding base wall and disposed at an obtuse angle relative to a front edge of the corresponding sidewall.

4. The tool according to claim 3, wherein the obtuse angle is substantially 135°.

5. The tool according to claim 4, wherein a bottom edge and the front edge of each sidewall form an acute angle.

6. The tool according to claim 5, wherein the acute angle is substantially 45°.

7. The tool according to claim 2, wherein the jaws are attached to the sidewalls at central regions of outer surfaces of the sidewalls.

8. The tool according to claim 1, wherein the base walls and sidewalls of the grabbing members are configured such that a width of the U-shaped channel substantially corresponds to the thickness of a 2× board.

9. The tool according to claim 1, wherein the grabbing members are secured to the jaws of the locking pliers by welding.

10. The tool according to claim 1, wherein the pliers can assume a locked condition with the teeth being embedded in the received board.

11. The tool according to claim 1, wherein each grabbing member has a portion which is bent inwardly from an upper end of the corresponding sidewall and which includes a plurality of teeth for embedding into the board received in the U-shaped channel.

12. The tool according to claim 1, wherein a height of the U-shaped channel is greater than a width of the U-shaped channel.

13. The tool according to claim 1, wherein a height of each sidewall is greater than a width of the corresponding base wall.

14. The tool according to claim 1, wherein the locking pliers extend rearwardly of the grabbing portions.

* * * * *